United States Patent
Lim et al.

(10) Patent No.: US 10,380,544 B2
(45) Date of Patent: Aug. 13, 2019

(54) METHOD AND APPARATUS FOR AVOIDING EVIDENCE CONTAMINATION AT AN INCIDENT SCENE

(71) Applicant: MOTOROLA SOLUTIONS, INC, Chicago, IL (US)

(72) Inventors: Bing Qin Lim, Jelutong (MY); Alfy Merican Ahmad Hambaly, Bayan Baru (MY); Shijie Hua, Puchong (MY); Chew Yee Kee, Alor Setar (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 174 days.

(21) Appl. No.: 15/390,472

(22) Filed: Dec. 24, 2016

(65) Prior Publication Data
US 2018/0182167 A1   Jun. 28, 2018

(51) Int. Cl.
| | |
|---|---|
| *G06T 19/00* | (2011.01) |
| *G06Q 10/08* | (2012.01) |
| *G06T 11/00* | (2006.01) |
| *G06Q 50/26* | (2012.01) |

(52) U.S. Cl.
CPC .......... *G06Q 10/087* (2013.01); *G06T 11/00* (2013.01); *G06Q 50/265* (2013.01)

(58) Field of Classification Search
CPC .......................... G06T 19/003; G06T 19/006
See application file for complete search history.

(56) References Cited

U.S. PATENT DOCUMENTS

| | | | |
|---|---|---|---|
| 6,816,075 B2 | 11/2004 | Grunes et al. | |
| 8,998,083 B2 | 4/2015 | Macintyre | |
| 9,235,870 B2 | 1/2016 | Kottoor et al. | |
| 2007/0005233 A1 | 1/2007 | Pinkus et al. | |
| 2009/0171961 A1 | 7/2009 | Fredrickson | |
| 2011/0193985 A1* | 8/2011 | Inoue ................. | H04N 5/23216 348/222.1 |
| 2013/0046562 A1* | 2/2013 | Taylor .................... | G06Q 40/00 705/4 |
| 2013/0314398 A1* | 11/2013 | Coates ..................... | G09G 5/14 345/419 |
| 2015/0095355 A1* | 4/2015 | Patton .................... | G06F 16/29 707/754 |
| 2015/0112581 A1 | 4/2015 | Hakim | |

(Continued)

*Primary Examiner* — Yi Yang (57) ABSTRACT

Improved incident scene investigation is provided by displaying the incident scene and evidence pertaining to the incident scene on a display of a portable communication device where the display is augmented with tagged evidence attributes and/or further augmented with geofenced safeguard areas surrounding pieces of evidence. The evidence attributes provide and display risk assessment information as to which pieces of evidence at an incident scene are vulnerable to being contaminated or damaged. The evidence attributes may further provide and display an impact factor indicator indicating whether a piece of evidence is likely to be impacted by a context factor from the incident scene. Alerts can be generated at the portable device upon approach to a geofenced safeguarded area surrounding vulnerable evidence. The augmented display of the incident scene can also redirect a user approaching a particular piece of evidence.

8 Claims, 6 Drawing Sheets

(56) References Cited

U.S. PATENT DOCUMENTS

| | | | | |
|---|---|---|---|---|
| 2015/0158510 A1* | 6/2015 | Fries | ............... | B61L 1/181 |
| | | | | 701/19 |
| 2015/0379777 A1* | 12/2015 | Sasaki | ............... | A63F 13/211 |
| | | | | 345/633 |
| 2016/0171771 A1* | 6/2016 | Pedrotti | ............... | G02B 27/017 |
| | | | | 345/633 |

* cited by examiner

METHOD AND APPARATUS FOR AVOIDING EVIDENCE CONTAMINATION AT AN INCIDENT SCENE

RELATED APPLICATIONS

This application is related to U.S. application Ser. No. 15/390,470, and application Ser. No. 15/390,471 commonly assigned to and owned by Motorola Solutions, Inc.

FIELD OF THE INVENTION

The present invention relates generally to communication systems, devices and methods that facilitate searching incident scenes for evidence, and more particularly to the preservation of evidence at an incident scene.

BACKGROUND

Public safety communication systems, such as those used in law enforcement, fire rescue, and mission-critical environments, are often used to investigate an incident scene, whether it be a crime scene, accident scene or other incident scene involving investigators and forensic analysts. It is not uncommon for numerous individuals, some from different job functions and backgrounds, to show up at an incident scene for the gathering and preservation of evidence. For example, crime scene investigators, first responders, and forensic specialists, may be just a few of the individuals involved in searching and gathering evidence from an incident scene. However, not all individuals need or should handle each piece of evidence at an incident scene. Certain pieces of evidence are more vulnerable than others to being contaminated or damaged, and potentially valuable evidence may be destroyed or rendered inadmissible if handled incorrectly.

Accordingly, there is a need for minimizing the risk of evidence contamination or damage of evidence at an incident scene.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a communication device, a method and a system that facilitate searching an incident scene for evidence. In accordance with some embodiments, a portable electronic device provides an improved displayed augmented search path for searching an incident scene through the addition of displayed evidence tags which further display evidence attributes. The displayed evidence attributes provide information pertaining to vulnerability to contamination and/or damage to each piece of evidence, along with an identification of one or more context parameters of the incident scene as a source (cause) of potential contamination/damage to each piece of evidence. Thus, depending on the location of an incident scene, each piece of evidence may be tagged with displayed information such as high or low vulnerability to evidence contamination and true or false source impact by incident scene context parameter. Calculated safeguarded geofenced areas can further be added to the display, based on the evidence attributes, to protect vulnerable evidence from being contaminated or damaged during a search. If information is desired pertaining to a particular piece of evidence, the user simply presses, taps, or otherwise selects the desired tag within the desired geofenced area to display the evidence attributes. Additional alerts can also be added to identify critical pieces of evidence, so that the user can either avoid these pieces or take extra precautions upon approaching those critical pieces of evidence. An optimal guide path can be generated though an incident scene which avoids vulnerable evidence by staying outside of the geofenced areas. The additional alerts provide a further assurance that the user will be alerted either visually on the display of the device and/or audibly from device upon approach to a vulnerable piece of evidence.

Figure 1:
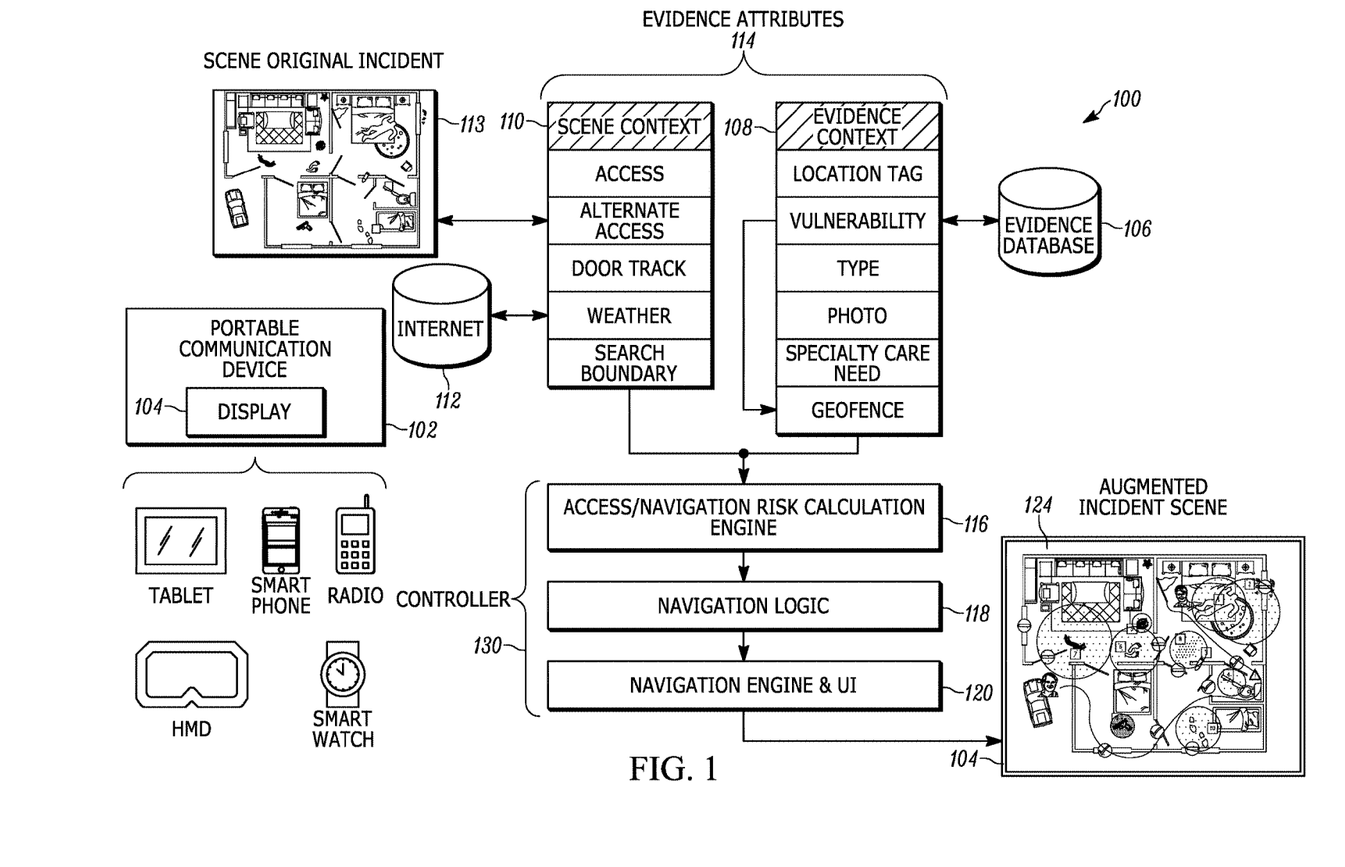
FIG. 1 is a block diagram of a communication system formed and operating in accordance with some embodiments.

FIG. 1 communication system 100 formed and operating in accordance with some embodiments. Communication system 100 comprises a portable communication device 102, such as a tablet, smartphone, smartwatch, head mounted display (HMD), or portable two-way radio, having a display 104, for presenting an optimal guide path for moving about an incident scene in accordance with the various embodiments. The communication system 100 comprises an evidence database 106 for inputting, storing and retrieving a plurality of evidence context information 108. Contextual incident scene parameters 110 pertaining to the scene itself can be determined or retrieved. The evidence context parameters and incident scene context parameters are collectively referred to as evidence attributes 114.

An initial incident scene 113 is reconstructed. The initial incident scene reconstruction can be generated using a variety of augmented reality generation techniques, such as 3-D laser scanning, real time kinematics (RTK), drones or other data analytic which can interoperate with communication system 100 and portable communication device 102 for suitable generation of augmented reality displays.

In accordance with some embodiments, the incident scene reconstruction may further be updated from databases of communication system 100, such as a CAD database (not shown), internet database 112, and evidence database 106. Additionally, initial incident scene parameters entered into the portable communication device 102 by a user of the device performing a walkthrough of the incident scene are entered into a controller to provide updated augmented reality to the display.

Evidence context information 108 can be gathered, for example, during an initial walkthrough of an incident scene, and used as part of an initial incident scene reconstruction 113. The initial gathering and determining of evidence context information may include such evidence context parameters as electronically tagging, via the portable communication device, for identifying and locating the evidence. For example, evidence type can be entered, such a gun, blood splatter located by a broken window, or a bloody footprint located near a door, to name a few. The initial gathering and determining of evidence context information may further comprise photos taken of the incident scene and particularly photos of evidence within the incident scene.

In accordance with some embodiments, special needs for particular types of evidence can be noted, for example a predetermined or desired virtual geofenced safeguarded area for particular types of evidence can be entered or if previously stored for certain types of evidence, for later retrieval. For example, a predestined setting may be that a firearm on the ground automatically be assigned a 2 foot radius virtual keep-out geofence. Alternatively, geofenced safeguarded areas surrounding evidence may be determined or updated in response to the complete entry of evidence attributes input to the portable communication device. For certain types of evidence which are determined to be vulnerable to contamination and that are further determined to be at high risk for being impacted by context parameters, the geofenced safeguarded area can be updated accordingly.

Contextual incident scene parameters 130 pertaining to the scene itself can be determined or retrieved. For example contextual parameters can be determined during an initial assessment of the incident scene 114, such as access and alternate access, to the incident scene, door tracks and window ledges at the incident, and any particular search boundaries can be noted. Additional examples incident scene contextual parameters can be gathered pertaining to searchable parameters on the internet, such as weather (rain, wind conditions, snow, salt air, etc.) and traffic (rush hour, timed occurrence of bridge status) which are all retrievable via internet access 112. Hence, any context scene parameter that might be a source that could or might impact (put at risk) a certain piece of evidence will be input, either to the internet database 112 and/or the evidence database 106.

As stated previously, the evidence context parameters and incident scene context parameters are collectively referred to as evidence attributes 114. These evidence attributes 114 are entered into the portable communication device 102 to a controller 130 thereby enabling the portable communication device 102 to generate an augmented reality display 124 of the incident scene.

As will be shown in subsequent views, the augmented reality display 124 of the incident scene displays the incident scene with evidence tags and/or geofenced areas pertaining to the evidence. An optimum guide path for the incident scene may be generated in response to a user input selecting a destination within the displayed augmented incident scene 124. The evidence tags can further be accessed, such as by tapping the display at the tag, to further display evidence attributes of each piece of evidence. The evidence attributes display vulnerability to contamination and potential impact by an incident context source.

The determination of an optimum guide path is carried out by the controller 130 of portable communication device 102. Controller 130 utilizes a navigation risk calculation engine 116, navigation logic 118, and a navigation engine in conjunction with a user interface 120, such as a touch display interface of the portable communication device 102, to determine an optimum navigation guide path through the incident scene. The navigation risk calculation engine 116 calculates an access risk based on interaction between evidence context parameters 108 and incident scene context parameters 130. The navigation logic 118 utilizes the user input destination selection and the accessibility thereto, any safeguarded geofenced areas already in place, and the interaction between the evidence context parameters 108 and the incident scene context parameters 130 to determine an optimum guide path to avoid contamination of the evidence by the investigator user of the device.

For example, the impact of an incident scene context source, such as weather/rain, impacting a particularly vulnerable piece of evidence, such as blood splatter, may be even higher than normal, if that blood splatter is located on a carpet next to an open window. The blood splatter vulnerability to water and its location relative to the source of the water (a broken window) would indicate a guide path that bring the user as fast as possible to attend to the area near that evidence, without disturbing the evidence, so that data can be taken quickly and/or as much of the evidence gathered and removed from the scene. For example, it may be necessary to slice the carpet to preserve the blood splatter before a rain storm blows water and debris through the broken window. Thus, the displayed augmented incident scene 124 showing the optimum guide path in conjunction with all the evidence tags having their respective evidence attributes associated therewith and even geofenced areas can be displayed.

The communication system 100 is also dynamic in that changes occurring to the incident scene context parameters can be automatically updated, such as weather forecasts and traffic updates. The user interface of the portable communication device and as additional entry of evidence context parameters can further update the augmented incident scene 124. Thus evidence that may need to be updated in terms of precautionary measures can be protected and evidence can be added and/or even removed as needed from the augmented scene 124. As mentioned previously additional visual or audible alerts can also be generated to alert a user to particular warning pertaining to certain pieces of evidence or the scene itself.

Figure 2:
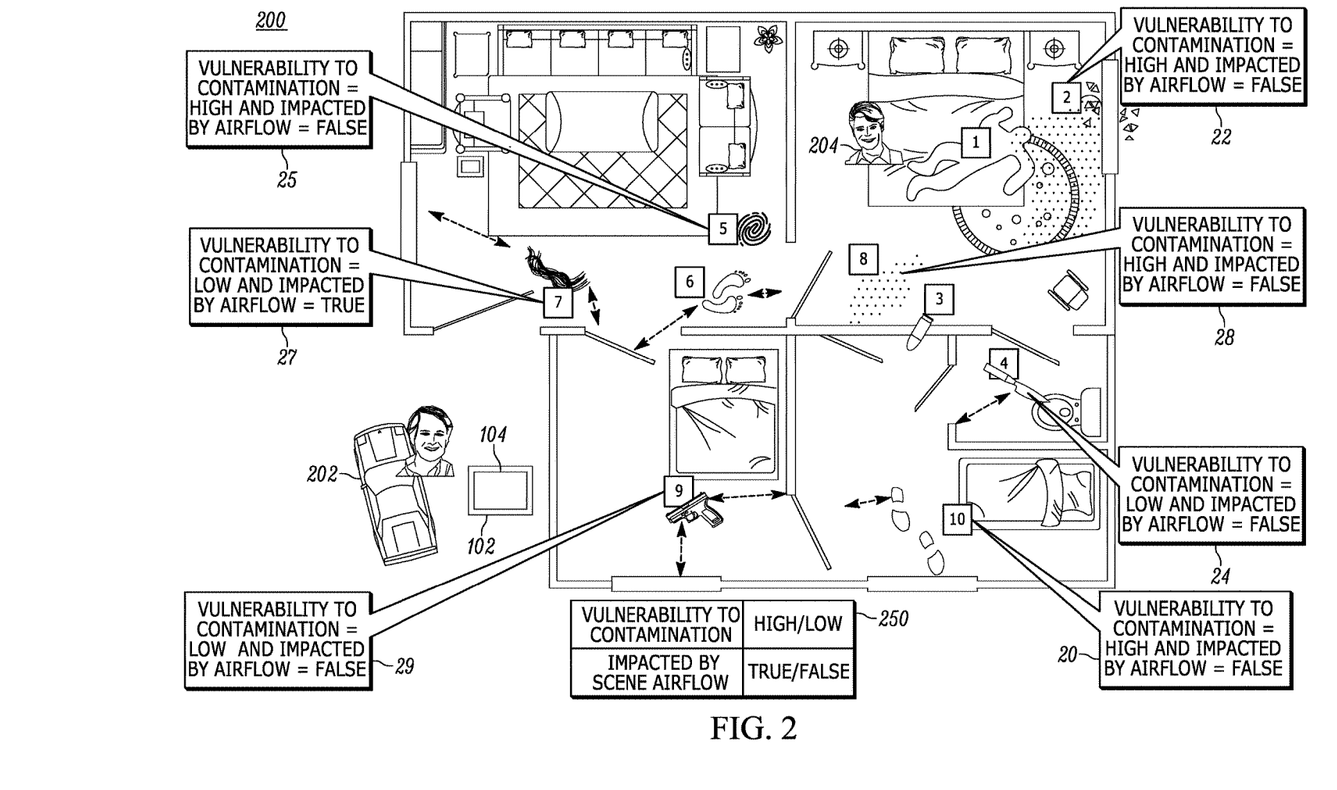
FIG. 2 is an example of a displayed augmented reality incident scene displaying evidence tags for each piece of evidence and respective evidence attributes associated with each tag in accordance with some of the embodiments.
Figure 3:
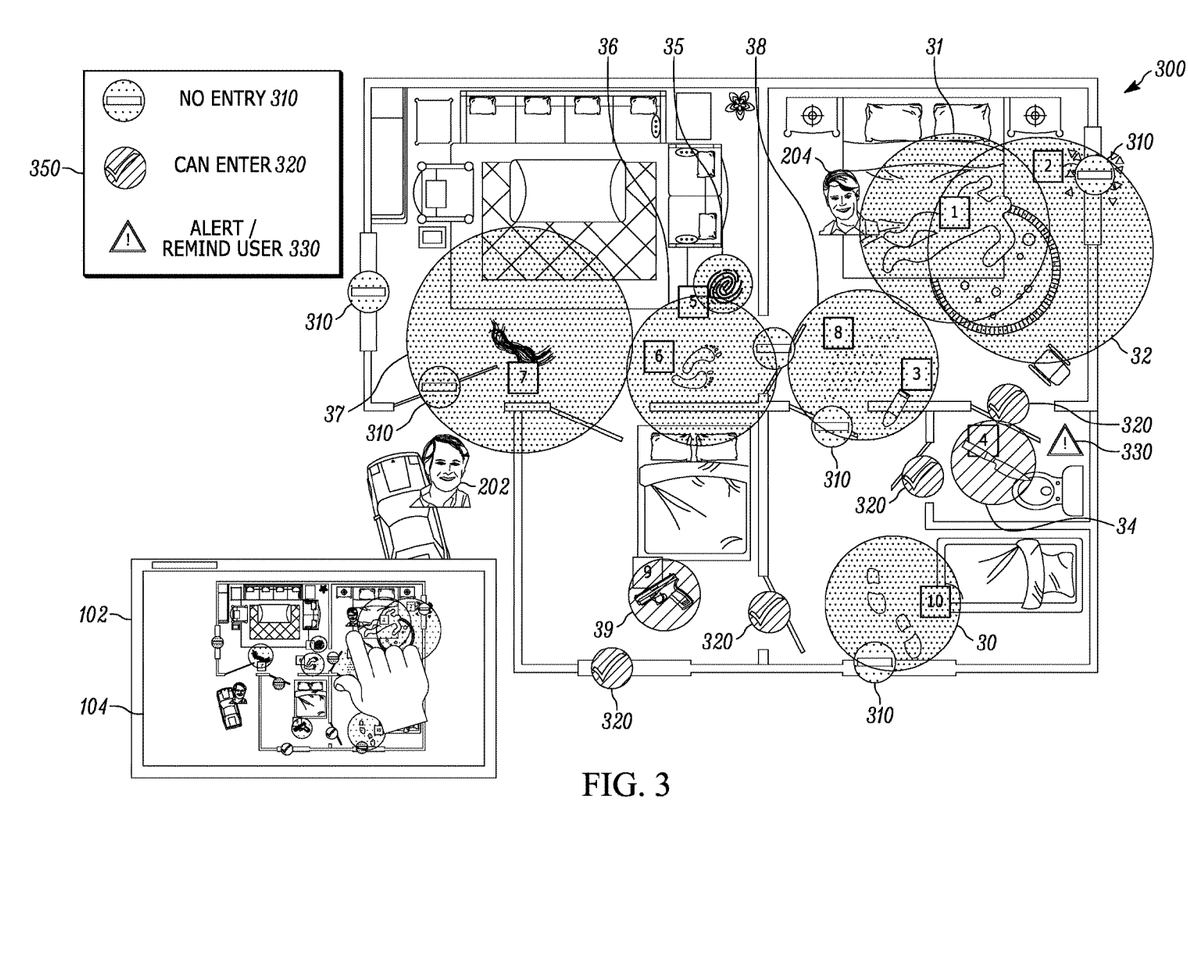
FIG. 3 is an example of a displayed augmented reality incident scene further augmented with geofenced safeguarded areas around the evidence in accordance with some of the embodiments.
Figure 4:
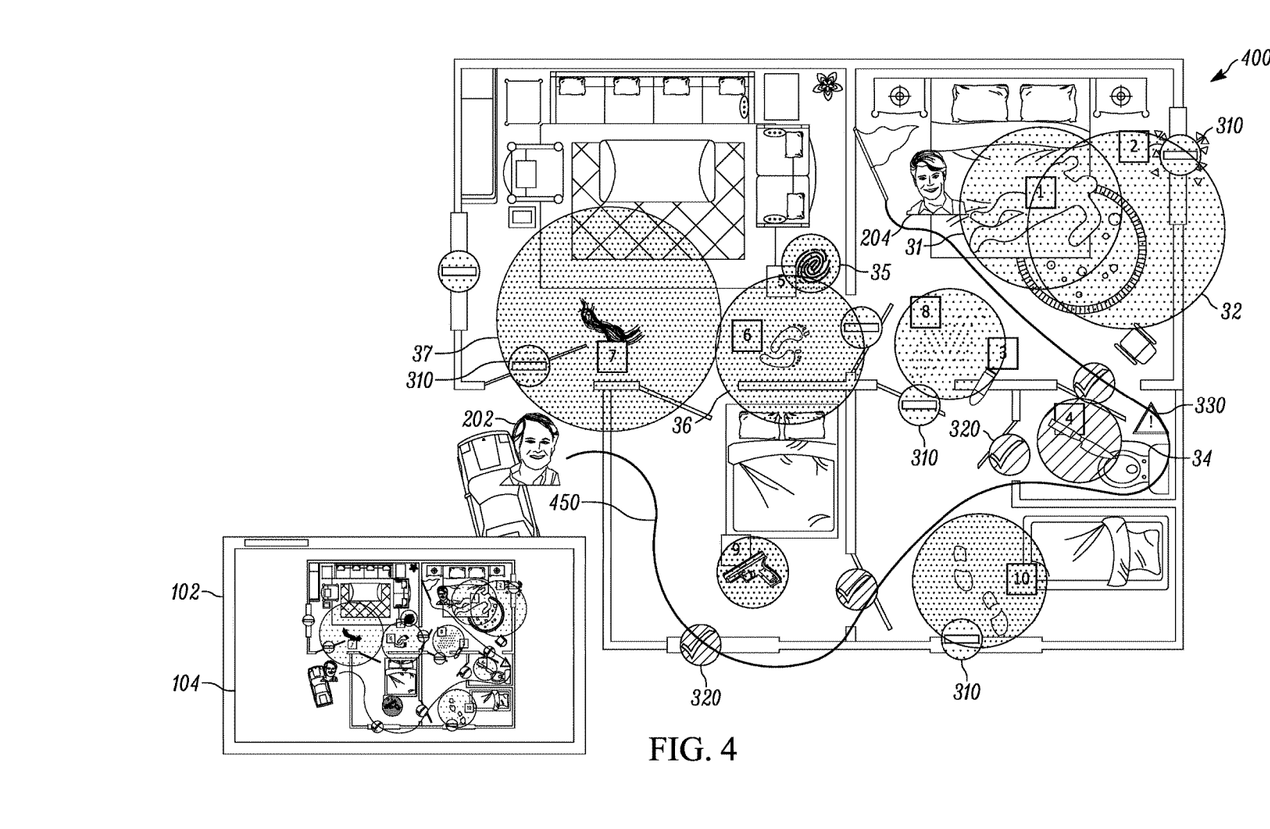
FIG. 4 is an example of a displayed augmented reality incident scene further augmented with an optimized guide path that minimizes risk of evidence contamination or damage in accordance with some of the embodiments.

The display 104 of portable communication device 102 is shown displaying an augmented reality of an incident scene in FIGS. 2, 3 and 4. The augmented scene is shown in its stages with FIG. 2 showing selectable evidence tags, FIG. 3 showing incident scene geofenced areas and geofenced evidence safeguarded areas, and FIG. 4 further displaying a guide path through the augmented incident scene in response to a user's destination input. A user 202 may be for example an investigator seeking to reach another investigator 204 or some destination within the scene without contaminating or damaging any evidence within an incident scene. FIG. 2 is an example of a displayed augmented reality incident scene displaying evidence tags for each piece of evidence and respective evidence attributes associated with each tag in accordance with some of the embodiments.

FIG. 2 shows augmented display 200 displaying of an incident scene with selectable evidence tags 1, 2, 3, 4, 5, 6, 7, 8, 9, 10 with certain tags 2, 4, 5, 7, 8, 9, and 10 selected to display their respective evidence attributes 20, 22, 24, 25, 27, 28, and 29. Each tag is user selectable to display its associated evidence attributes, wherein the evidence attributes, as shown by legend 250, contain vulnerability to contamination (high or low) and impact by context parameter source (true or false). Percentages can be attributed to the vulnerability parameters. For example, when evidence tag 2 is selected, the evidence attributes associated with this piece of evidence are showing vulnerability to contamination=high and impact by airflow (a scene context parameter)=false, however other context scene parameters could also be added, if applicable, that have potential impact to the evidence. As another example, water/rain (incident scene context parameter) could potentially impact a blood splatter tagged by evidence tag 2, due to the location of the blood splatter near a broken window. Additional, different incident scene context parameters can be added to an evidence tag if desired.

FIG. 3 is an example of a displayed augmented reality incident scene further augmented with geofenced safeguarded areas around the evidence in accordance with some of the embodiments. FIG. 3 shows an augmented display 300 displaying the incident scene with the previous evidence tags 1-10 (de-selected in this view) and further displaying geofenced safeguarded areas 30, 31, 32, 35, 36, 37, 38, 39 highlighted around one or more pieces of evidence that are vulnerable to contamination and have potential impact of such contamination or other damage to the evidence caused from a context parameter. Each geofenced area is sized based on contamination type and evidence vulnerability to the contamination type.

Evidence which having evidence attributes which are not vulnerable to contamination and not impacted by any context parameters such as the evidence attributes 29 at evidence tag 9 of FIG. 2 and attributes 24 at tag 4 of FIG. 2 can either be left without highlighting or have a different small area of highlighting indicating that the evidence is clear to approach.

Legend 350 shows additional display icons which can be used to further identify incident scene context information such as windows and doors that are marked as no-entry 310, and acceptable entry 320. Additionally a user alert icon 330 can be displayed with information that provides an additional, such as avoiding opening a door so as not to disturb evidence, even though it may not be vulnerable to contamination or potentially impacted by a context parameter, but may have some other point of interest. (e.g. opening a door too wide will impact or move or relocate the evidence to another location that might impact the crime hypothesis or crime reconstruction analysis, although the evidence by itself might not be contaminated by the door impact.)

The selectable tags, geofenced incident boundaries and safeguarded geofenced evidence boundaries, entry/non-entry icons, and alerts shown as part of the augmented display of the portable device 102 can all be displayed in response to a user, such as a user 202, entering a destination input to the displayed incident scene. The user 202 may, as mentioned previously, be seeking to reach some destination or individual within the scene, without contaminating or damaging any evidence. The actual guide path is calculated to avoid the keep out areas as is shown in the next figure.

FIG. 4 is an example of the displayed augmented reality incident scene further augmented with an optimized guide path 450 that minimizes risk of evidence contamination or damage in accordance with some of the embodiments. The guide path is generated in response to a user-input destination point being entered at the portable communication device. The guide path 450 is automatically adjusted and displayed to avoid risk of evidence contamination.

An optimum navigation path 450 is determined by the portable communication device based on interaction between evidence context parameters and incident scene context parameters, along with safeguarded geofenced areas, and the user input destination selection thereby advantageously providing accessibility to a user of the portable communication device to the incident scene without contamination or damage to evidence.

Figure 5:
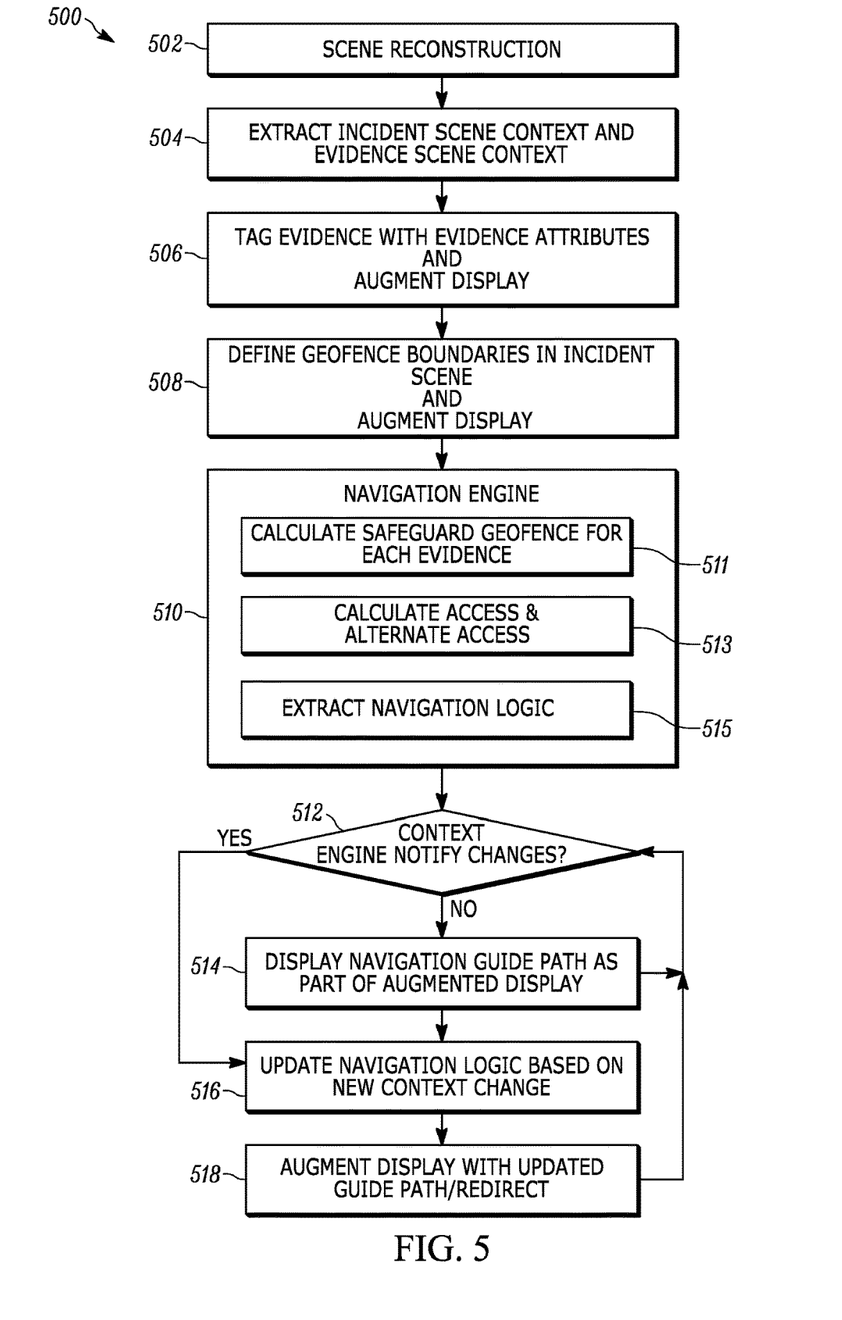
FIG. 5 is a method for avoiding evidence contamination or damage in accordance with some embodiments.

FIG. 5 is a method 500 for avoiding evidence contamination or damage in accordance with some embodiments. Scene reconstruction begins at 502 such as with the use of 3-D laser scanner, real time kinematics (RTK), and drones which recreate the incident scene and upload it to the portable communication device. At this point the recreated scene is a non-augmented scene.

Evidence scene context parameters and incident scene context parameters are extracted at 504. Evidence scene context parameters available from the non-augmented scene evidence type, location, special needs and any previously saved vulnerability, previously saved safeguard geofence information pertaining to a particular type of evidence or special needs information associated with a type of evidence and the like.

Some incident scene context parameters are available from the non-augmented scene, such as door, window, and access path location, and these incident scene context parameters can be extracted at 504. Other incident scene context parameters can also be extracted at 504, such as environmental parameters of importance to the scene, such as weather or traffic conditions, that could impact evidence.

Evidence is electronically tagged at 506 with selectable evidence tags, each tag having evidence attributes associated therewith. The electronic tag and evidence attribute information are uploaded to the augmented display. The evidence attributes, as previously described, are vulnerability to contamination/damage (high/low percentage) and impact by an incident context parameter. The evidence attributes can be uploaded to the augmented display during a walkthrough of the incident scene while entering information into the portable electronic device and/or automated uploads from the internet.

The incident scene can be augmented with geofenced boundaries at 508. These geofenced boundaries can be added for both incident context parameters and evidence context parameters, as applicable. For example, incident scene geofenced boundaries can be applied to access points of doors and windows with identifiers as to whether they provide access or non-access, or should be avoided. Safeguard evidence geofenced boundaries, if any were previously saved for a particular type of evidence, can be applied to that evidence.

The evidence attributes, along with any other extracted information, are then input to the navigation engine of the portable communication device at 510 so that initial or updated safeguard geofenced areas can be calculated, for each piece of evidence at 511. Access paths and risk associated with each access path and alternate access path are calculated at 513. The navigation logic is extracted at 515 based on the safeguarded geofenced areas of evidence, accessibility of an access point, and interaction between incident scene context and evidence context.

If no context parameter changes occur (with either the evidence context or the incident scene context), then the display of the portable communication device can display the current calculated guide path as the augmented guide path at 514, and return to recheck for context notification changes at 512. If changes in the incident scene context or evidence context did occur at 512, then the navigation logic is updated in response thereto at 516, and an updated augmented guide path is displayed at 518. The updated augmented guide path displayed at 518 may even redirect a user of the portable communication device along a different path, and return to recheck for context notification changes at 512.

Figure 6:
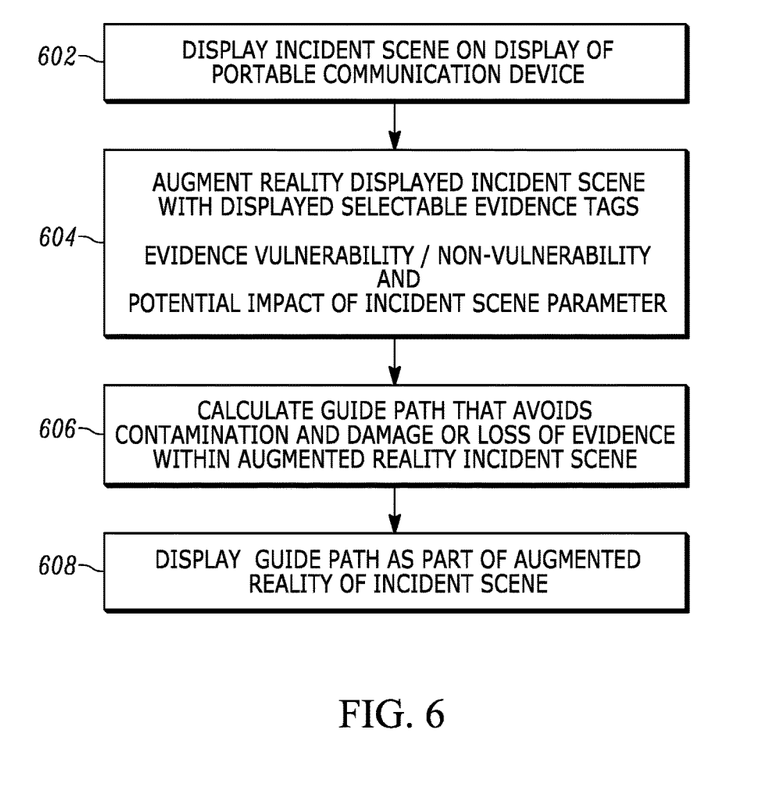
FIG. 6 is a method that summarizes determining a guide path using a portable communication device having an augmented reality display in accordance with some embodiments.

FIG. 6 is a method 600 summarizing determining a guide path using a portable communication device having an augmented reality display in accordance with some embodiments. The method 600 uses a portable communication device such as previously described, for example a tablet, a smart phone, a portable two-way radio, a head mounted display (HMD) or other display having augmented reality capability. The method 600 begins at 602 by displaying an initial non-augmented incident scene. The non-augmented view will include evidence pertaining to the incident scene on a display of a portable communication device.

In accordance with the embodiments, the displayed incident scene is augmented with selectable evidence tags at 604, wherein each evidence tag can further be accessed to obtain evidence attributes. These evidence attributes, as was described in FIG. 1 and shown in FIG. 2, may be displayed as part of the augmented display to indicate: evidence vulnerability/non-vulnerability to contamination or damage (for example a percentage risk of contamination) and one or more incident scene context parameters having a potential impact on the evidence (for example as a true/false condition).

The vulnerability parameters of 604 may further have been determined based on other evidence context parameters such as type of evidence, age of evidence, photos, specialty needs for the evidence. In accordance with some embodiments, geofenced safeguarded areas are identified for each piece of evidence as part of the vulnerability analysis.

The selectable evidence tags and geofenced boundaries (both evidence safeguarded geofenced boundaries and incident scene parameter geofenced boundaries) are displayed as part of the reconstructed scene on the display, such as was seen in FIG. 4. Again, the sizing each geofenced safeguarded area for each piece of evidence is preferably based on evidence type and contamination vulnerability.

A guide path is calculated at 606 that avoids contamination and damage of evidence within the augmented reality incident scene and displayed at as part of the augmented reality of the incident scene at 608. The calculation of the guide path takes into account both the tagged evidence vulnerability/non-vulnerability and incident scene context parameters and geofenced areas. Both geofenced evidence areas and incident access geofenced areas are taken into account as part of the guide path calculation along with the interaction between the incident scene context parameters and the evidence context parameters.

The calculated guide path of 606 can be dynamically updated and displayed at 608 along with evidence attributes and geofenced areas in response to changes in the incident scene context and new entry of destination inputs by a user. The method 600 thus automatically displays and adjusts the guide path to redirect a user as needed. Method 600 can be further enhanced through the addition of visual alerts being displayed and/or audible alerts being played as users approach predetermined locations proximate to the geofenced safeguarded areas and/or geofenced boundaries to provide additional warnings to avoid evidence contamination or damage.

The vulnerability to contamination and damage extends to loss of evidence as well Loss. For example the vulnerability of hair evidence being lost due to airflow (type) forms a door being open (source). This is the source of contamination. Thus, evidence type, matched with contamination type and source type whether it causes contamination, damage or loss of evidence can be taken into account.

The following Table provides an example of geofence size determination for various Evidence Vulnerability types and Source of Contamination:

| Evidence Vulnerability Type | Vulnerability Level | Source of Contamination Contamination Type | Strength | Interaction between Evidence & Source of Contamination | Geofence |
|---|---|---|---|---|---|
| Air Flow | High | Air Flow | High | Near | Very Big |
| Air Flow | High | Physical Contact | High | Near | Small |
| Air Flow | High | Air Flow | High | Far | Small |
| Liquid | High | Air Flow | High | New | Small |
| Physical Contact | High | Door Track | Door Track Coverage | No Overlap | Small |

Accordingly, there has been provided a method and apparatus which provides for geofencing evidence at an incident scene. By incorporating the virtual geofence as part of an augmented reality incident scene, investigators can advantageously see the virtual geofence and avoid contamination or damage to evidence. Additional alerts generated from the portable communication device, visual and/or audible, can be generated as a user approaches specific locations shown on the display which are proximate to geofenced safeguarded areas, thereby avoiding damage or contamination of evidence.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for generating a guide path for an incident scene using a portable communication device, comprising:
   displaying the incident scene and evidence pertaining to the incident scene on a display of the portable communication device;
   augmenting reality of the displayed incident scene with displayed selectable evidence tags, the selectable evidence tags displaying evidence attributes;
   calculating a guide path that avoids contamination and damage of evidence within the augmented reality incident scene based on the evidence attributes; and
   displaying the guide path as part of the augmented reality of the incident scene;
   generating and displaying geofenced safeguarded areas highlighted around each piece of evidence that is vulnerable to contamination; and
   sizing each geofenced safeguarded area based on evidence type and vulnerability to contamination.

2. The method of claim 1, further comprising:
   redirecting a user that approaches a piece of evidence having an evidence attribute that indicates a vulnerability to contamination.

3. The method of claim 1, further comprising:
   generating visual or audible alerts at specific locations on the display proximate to the geofenced safeguarded areas to avoid damaging or contaminating evidence upon approaching the geofenced safeguarded areas.

4. The method of claim 1, wherein calculating the guide path further comprises:
   calculating the guide path in response to a destination point being entered at the portable communication device.

5. The method of claim 4, further comprising:
   automatically adjusting and displaying the guide path based on changes in the evidence attributes to avoid risk of evidence contamination.

6. The method of claim 1, further comprising:
   calculating a risk assessment of contaminating or damaging evidence based on interaction between the evidence type and incident scene context parameters.

7. The method of claim 6, further comprising:
dynamically updating the guide path calculation and displaying the updated guide path in response to changes in the evidence type and changes in the incident scene context parameters.

8. The method of claim 1, wherein the portable communication device comprises one of:
a tablet, a head mounted display (HMD), a smart watch, or a portable radio.

* * * * *